US011924929B2

(12) United States Patent
Tsunekawa et al.

(10) Patent No.: US 11,924,929 B2
(45) Date of Patent: Mar. 5, 2024

(54) CERAMIC HEATER AND THERMOCOUPLE GUIDE

(71) Applicant: NGK INSULATORS, LTD., Nagoya (JP)

(72) Inventors: Daisuke Tsunekawa, Handa (JP); Shuichiro Motoyama, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 391 days.

(21) Appl. No.: 17/159,363

(22) Filed: Jan. 27, 2021

(65) Prior Publication Data

US 2021/0243847 A1 Aug. 5, 2021

(30) Foreign Application Priority Data

Feb. 3, 2020 (JP) ................................. 2020-016113

(51) Int. Cl.
*H05B 3/14* (2006.01)

(52) U.S. Cl.
CPC .................................... *H05B 3/143* (2013.01)

(58) Field of Classification Search
CPC ......... G01K 7/02; H01L 21/02; H01L 21/302; H01L 21/3065; H01L 21/68; H05B 3/14
See application file for complete search history.

(56) References Cited

U.S. PATENT DOCUMENTS

2004/0188413 A1 9/2004 Natsuhara et al.
2006/0011611 A1 1/2006 Goto et al.
2012/0211933 A1* 8/2012 Goto ................. H01L 21/68757 269/293
2016/0002779 A1 1/2016 Lin et al.
2019/0252162 A1* 8/2019 Ma ...................... C23C 16/4581

FOREIGN PATENT DOCUMENTS

JP 2004-247210 A 9/2004
JP 2004-296254 A 10/2004
JP 2006-049844 A 2/2006
(Continued)

OTHER PUBLICATIONS

Taiwanese Office Action (Application No. 110102990) dated Jan. 17, 2022.

(Continued)

*Primary Examiner* — Nathaniel E Wiehe
*Assistant Examiner* — Theodore J Evangelista
(74) *Attorney, Agent, or Firm* — BURR PATENT LAW, PLLC

(57) ABSTRACT

A ceramic heater includes a ceramic plate having a wafer placement surface, a tubular shaft having one end that is bonded to a rear surface of the ceramic plate on an opposite side to the wafer placement surface, a within-shaft region of the rear surface of the ceramic plate, an elongate hole extending from a start point in an outer peripheral portion of the within-shaft region to a terminal end position in the outer peripheral portion of the ceramic plate, and a thermocouple guide that guides a tip end of an outer-peripheral-side thermocouple to come into the start point of the elongate hole. A portion of the thermocouple guide, the portion extending from the other end (lower end) of the tubular shaft to the start point of the elongate hole, is formed in a shape following an inner wall of the tubular shaft.

10 Claims, 8 Drawing Sheets

(56) References Cited

FOREIGN PATENT DOCUMENTS

| | | | | | |
|---|---|---|---|---|---|
| JP | 2012-160368 | A | | 8/2012 | |
| KR | 10-2015-0132515 | A | | 11/2015 | |
| WO | 2012/039453 | A1 | | 3/2012 | |
| WO | 2013/162000 | A1 | | 10/2013 | |
| WO | WO-2013162000 | A1 | * | 10/2013 | ......... C23C 16/4581 |
| WO | 2014/144502 | A1 | | 9/2014 | |

OTHER PUBLICATIONS

Korean Office Action (with English translation) dated Jul. 10, 2022 (Application No. 10-2021-0011324).

* cited by examiner

CERAMIC HEATER AND THERMOCOUPLE GUIDE

BACKGROUND OF THE INVENTION

1. Field of the Invention

The present invention relates to a ceramic heater and a thermocouple guide.

2. Description of the Related Art

As one type of ceramic heater, there has hitherto been known the so-called two-zone heater in which resistance heating elements are embedded independently of each other in an inner peripheral side and an outer peripheral side of a disk-shaped ceramic plate having a wafer placement surface. For example, Patent Literature (PTL) 1 discloses a ceramic heater 410 with a shaft illustrated in FIG. 8. In the ceramic heater 410 with the shaft, a temperature in an outer peripheral side of a ceramic plate 420 is measured by an outer-peripheral-side thermocouple 450. A thermocouple guide 432 is a tubular member and is bent in an arch shape to turn 90° after extending straight through the inside of a straight shaft 440 from a lower side toward an upper side. The thermocouple guide 432 is attached to a slit 426*a* that is formed in a region of a rear surface of the ceramic plate 420, the region being surrounded by the straight shaft 440. The slit 426*a* serves as an inlet portion of a thermocouple passage 426. The outer-peripheral-side thermocouple 450 is inserted into a tube of the thermocouple guide 432 and extends up to a terminal end position of the thermocouple passage 426.

CITATION LIST

Patent Literature

[PTL 1] WO 2012/039453 A1 (FIG. 11)

SUMMARY OF THE INVENTION

However, the thermocouple guide 432 is disposed inside the straight shaft 440 near its center, and the slit 426*a* is disposed to extend along a diameter direction in the region of the rear surface of the ceramic plate 420, that region being surrounded by the straight shaft 440. This causes a problem that, in trying to arrange a plurality of terminals, a degree of freedom in arrangement of the terminals and so on is restricted.

The present invention has been made with intent to solve the above-mentioned problem, and a main object of the present invention is to increase a degree of freedom in arrangement of terminals and so on in a multi-zone heater.

A ceramic heater according to a first aspect of the present invention includes:

- a ceramic plate having a disk shape and having a wafer placement surface;
- a tubular shaft having one end that is bonded to a rear surface of the ceramic plate on an opposite side to the wafer placement surface;
- an inner-peripheral-side resistance heating element that is embedded in an inner peripheral portion of the ceramic plate;
- an outer-peripheral-side resistance heating element that is embedded in an outer peripheral portion of the ceramic plate;

- a within-shaft region of the rear surface of the ceramic plate, the within-shaft region locating within the tubular shaft;
- an elongate hole that extends from a start point in an outer peripheral portion of the within-shaft region to a predetermined terminal end position in the outer peripheral portion of the ceramic plate;
- associated parts that are disposed in the within-shaft region and that include a pair of terminals of the inner-peripheral-side resistance heating element and a pair of terminals of the outer-peripheral-side resistance heating element; and
- a thermocouple guide that guides a tip end of a thermocouple to come into the start point of the elongate hole,
- wherein a portion of the thermocouple guide, the portion extending from the other end of the tubular shaft to the start point of the elongate hole, is formed in a shape following an inner wall of the tubular shaft.

According to the above-described ceramic heater, a portion of the thermocouple guide, the portion extending from the other end of the tubular shaft (end of the tubular shaft on the opposite side to the end bonded to the rear surface of the ceramic plate) to the start point of the elongate hole, is formed in the shape following the inner wall of the tubular shaft. Thus, with the thermocouple guide disposed along the inner wall of the tubular shaft, even when the associated parts are disposed near the center of the within-shaft region and various members connected to the associated parts are arranged in an inner space of the tubular shaft, those associated parts and various members are less likely to interfere with the thermocouple. As a result, a degree of freedom in arrangement of the associated parts can be increased in a multi-zone heater.

In the ceramic heater according to the first aspect of the present invention, the thermocouple guide may be curved toward the start point of the elongate hole in a shape defining part of a spiral along the inner wall of the tubular shaft. With this feature, it is easier to arrange the thermocouple guide along the inner wall of the tubular shaft.

In the ceramic heater according to the first aspect of the present invention, the thermocouple guide may be curved to gradually change a direction to finally orient in a lengthwise direction of the elongate hole of the ceramic plate while approaching the elongate hole. With this feature, it is easier to insert the thermocouple into the elongate hole.

In the ceramic heater according to the first aspect of the present invention, the elongate hole may be curved toward the terminal end position from the start point. With this feature, when an obstacle, such as a through-hole, is present in the ceramic plate, the thermocouple can be arranged while avoiding the obstacle.

In the ceramic heater according to the first aspect of the present invention, the elongate hole may be curved toward the terminal end position from the start point, and a direction in which the elongate hole is curved may match a direction in which the thermocouple guide is curved, when viewing the ceramic heater from the other end side of the tubular shaft. With this feature, when an obstacle, such as a through-hole, is present in the ceramic plate, the thermocouple can be arranged while avoiding the obstacle, and when inserting the thermocouple into the elongate hole, the thermocouple can be inserted smoothly.

The ceramic heater according to the first aspect of the present invention may further include a thermocouple that is arranged to extend from the other end of the tubular shaft, to pass through the elongate hole, and to reach the terminal end position while being guided by the thermocouple guide.

A ceramic heater according to a second aspect of the present invention includes:

- a ceramic plate having a disk shape and having a wafer placement surface;
- a tubular shaft having one end that is bonded to a rear surface of the ceramic plate on an opposite side to the wafer placement surface;
- an inner-peripheral-side resistance heating element that is embedded in an inner peripheral portion of the ceramic plate;
- an outer-peripheral-side resistance heating element that is embedded in an outer peripheral portion of the ceramic plate;
- a within-shaft region of the rear surface of the ceramic plate, the within-shaft region locating within the tubular shaft;
- an elongate hole that extends from a start point in an outer peripheral portion of the within-shaft region to a predetermined terminal end position in the outer peripheral portion of the ceramic plate;
- associated parts that are disposed in the within-shaft region and that include a pair of terminals of the inner-peripheral-side resistance heating element and a pair of terminals of the outer-peripheral-side resistance heating element; and
- a thermocouple that is arranged to extend from the other end of the tubular shaft, to pass through the elongate hole, and to reach the terminal end position,
- wherein a portion of the thermocouple, the portion extending from the other end of the tubular shaft to the start point of the elongate hole, is formed in a shape following an inner wall of the tubular shaft.

According to the above-described ceramic heater, a portion of the thermocouple, the portion extending from the other end of the tubular shaft (end of the tubular shaft on the opposite side to the end bonded to the rear surface of the ceramic plate) to the start point of the elongate hole, is formed in the shape following the inner wall of the tubular shaft. Thus, with the thermocouple disposed along the inner wall of the tubular shaft, even when the associated parts are disposed near the center of the within-shaft region and various members connected to the associated parts are arranged in the inner space of the tubular shaft, those associated parts and various members are less likely to interfere with the thermocouple. As a result, a degree of freedom in arrangement of the associated parts can be increased in a multi-zone heater.

In the ceramic heater according to the second aspect of the present invention, the thermocouple may be curved toward the start point of the elongate hole in a shape defining part of a spiral along the inner wall of the tubular shaft. With this feature, it is easier to arrange the thermocouple along the inner wall of the tubular shaft.

In the ceramic heater according to the second aspect of the present invention, the thermocouple may be curved to gradually change a direction to finally orient in a lengthwise direction of the elongate hole of the ceramic plate while approaching the elongate hole. With this feature, it is easier to insert the thermocouple into the elongate hole.

In the ceramic heater according to the second aspect of the present invention, the elongate hole may be curved toward the terminal end position from the start point. With this feature, when an obstacle, such as a through-hole, is present in the ceramic plate, the thermocouple can be arranged while avoiding the obstacle.

In the ceramic heater according to the second aspect of the present invention, the elongate hole may be curved toward the terminal end position from the start point, and a direction in which the elongate hole is curved may match a direction in which the thermocouple is curved, when viewing the ceramic heater from the other end side of the tubular shaft. With this feature, when an obstacle, such as a through-hole, is present in the ceramic plate, the thermocouple can be arranged while avoiding the obstacle, and when inserting the thermocouple into the elongate hole, the thermocouple can be smoothly inserted.

A thermocouple guide according to the present invention includes a region from a tip end portion to a base end portion or a region from the tip end portion to a midway point before reaching the base end portion, the region being curved to define part of a spiral.

The above-described thermocouple guide is suitable for use as the thermocouple guide that constitutes the above-described ceramic heater according to the first aspect of the present invention.

DETAILED DESCRIPTION OF THE INVENTION

Figure 1:
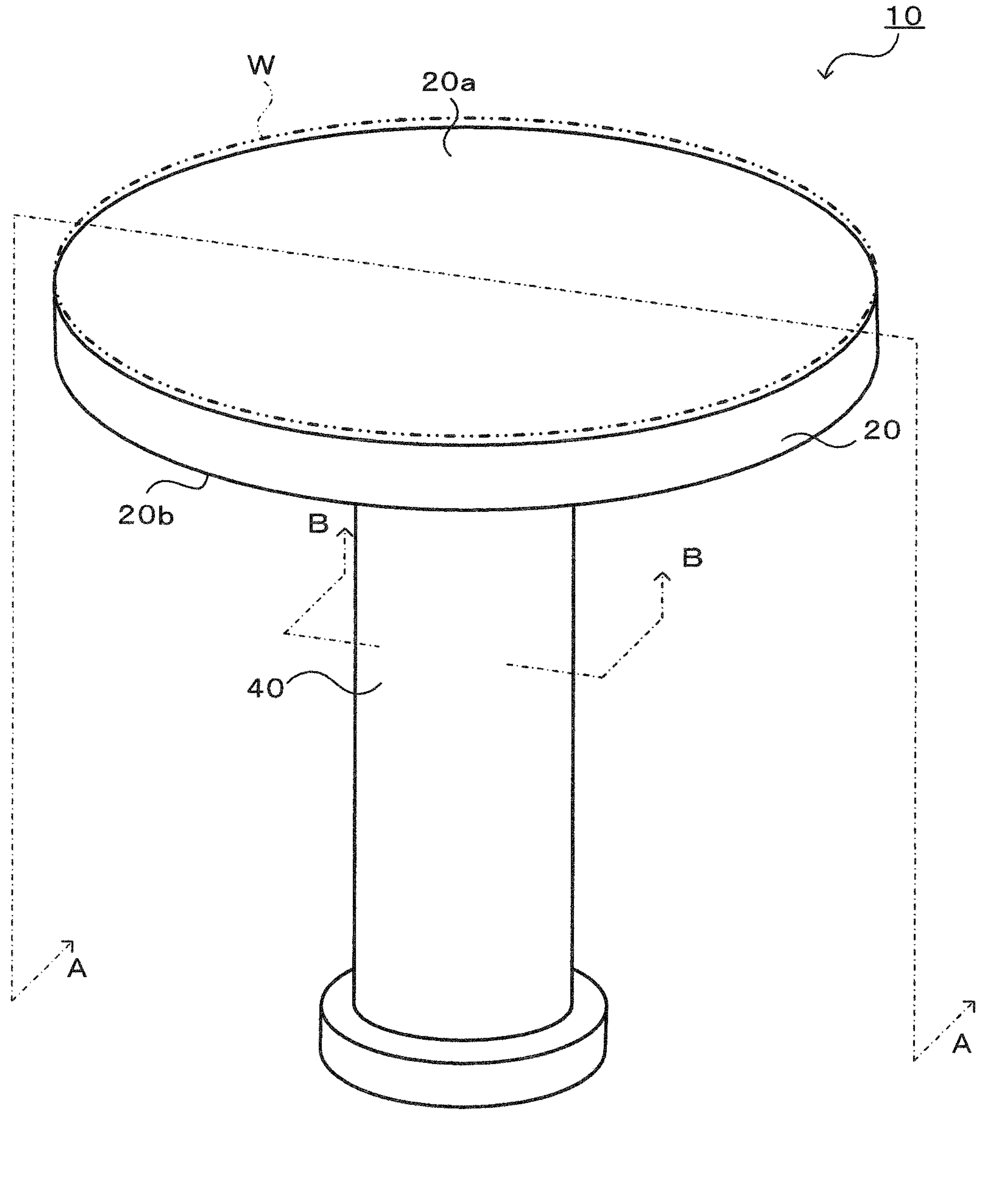
FIG. 1 is a perspective view of a ceramic heater 10.
Figure 2:
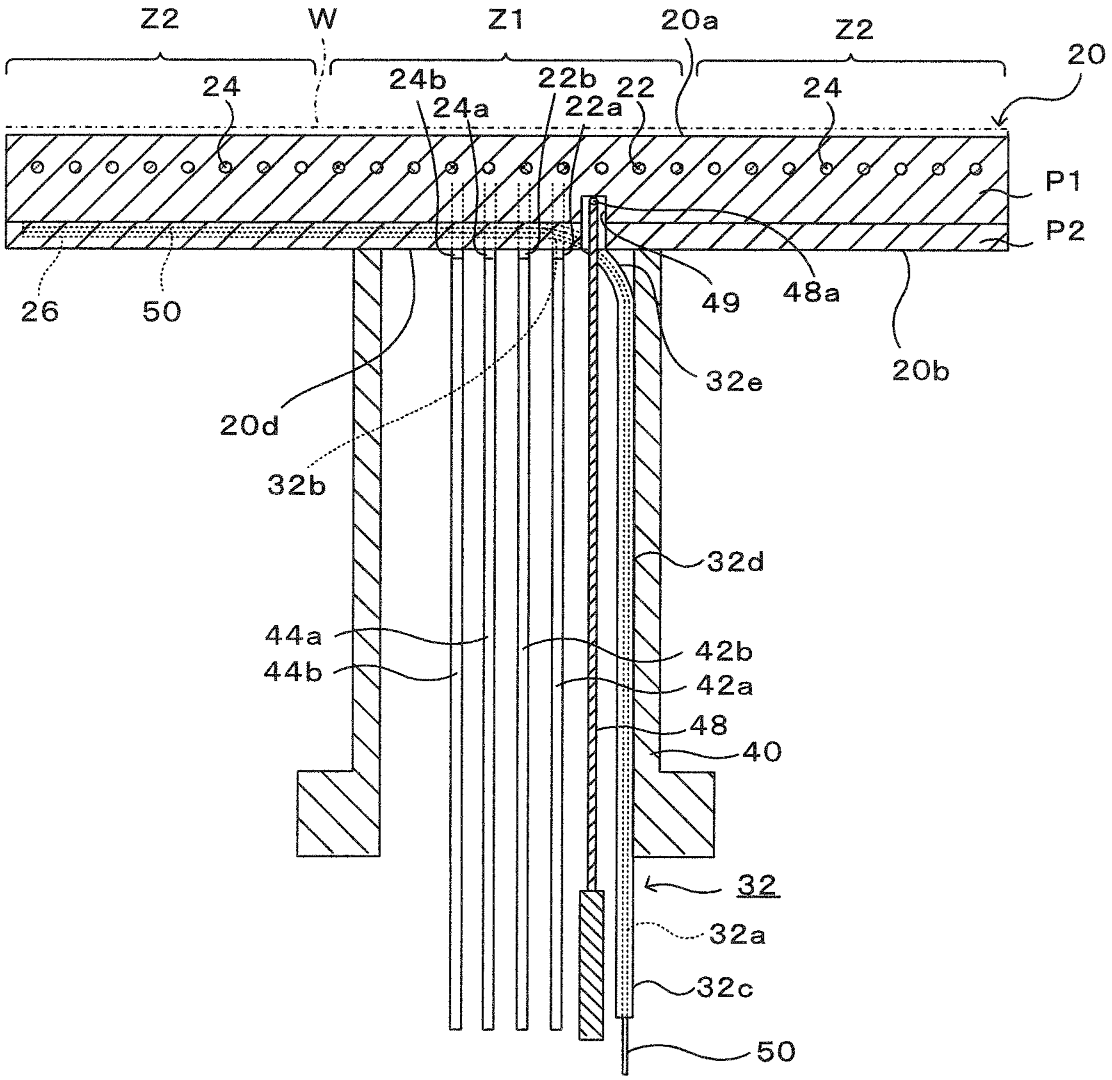
FIG. 2 is a sectional view taken along A-A in FIG. 1.
Figure 3:
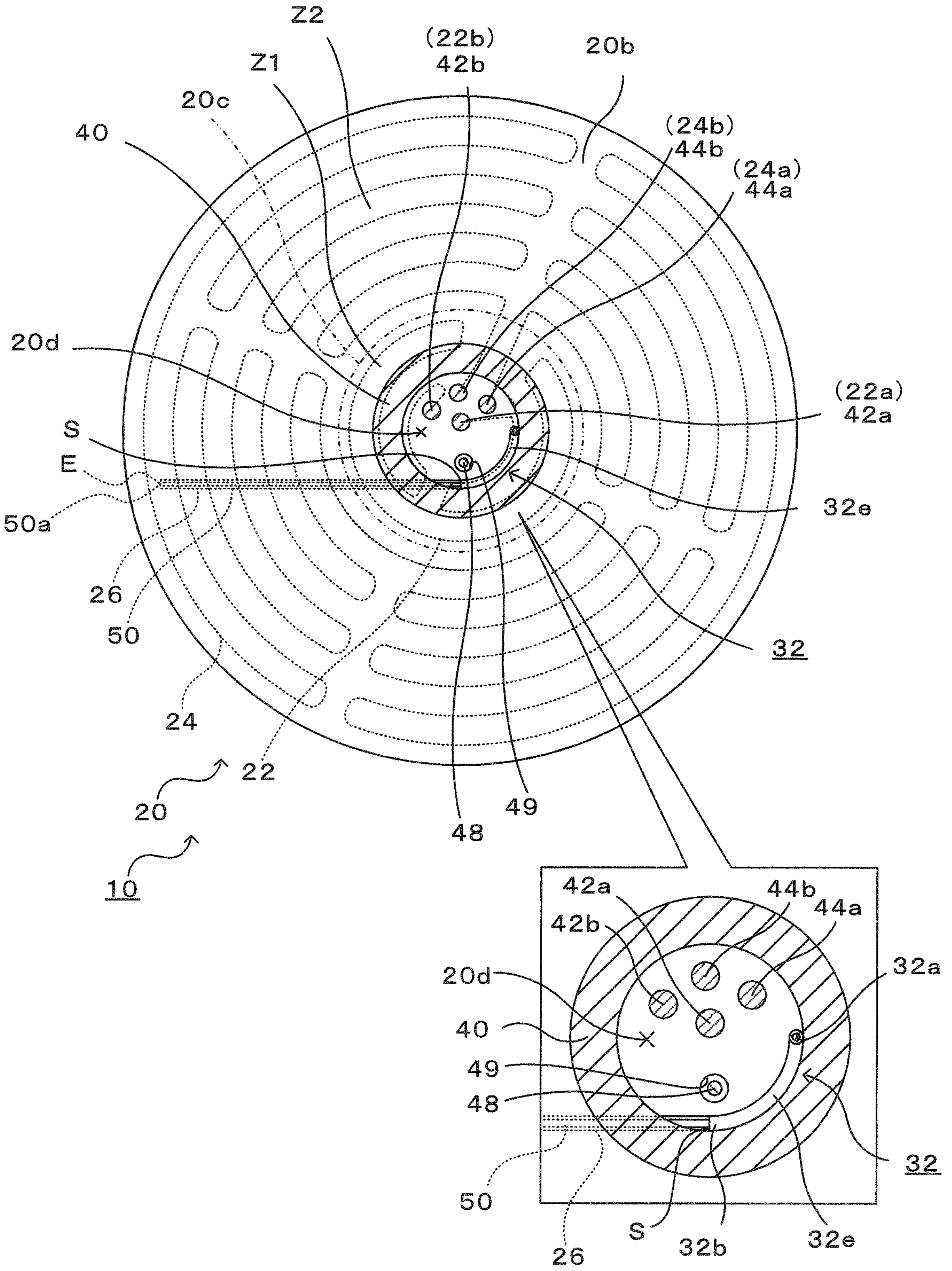
FIG. 3 is a sectional view taken along B-B in FIG. 1.
Figure 4:
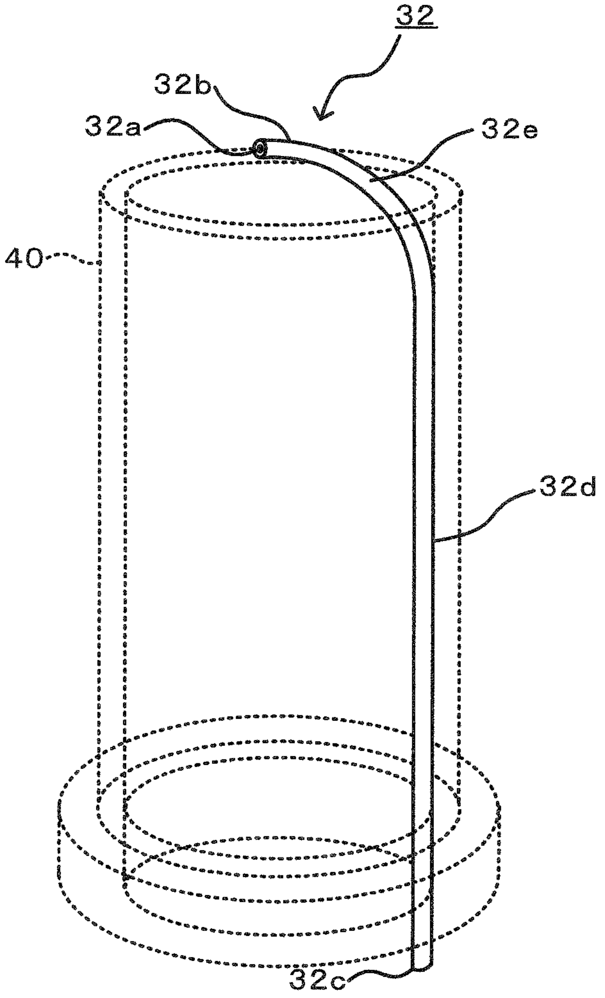
FIG. 4 is an explanatory view illustrating an example of a thermocouple guide 32 in a tubular shaft 40.

Preferred embodiments of the present invention will be described below with reference to the drawings. FIG. 1 is a perspective view of a ceramic heater 10, FIG. 2 is a sectional view taken along A-A in FIG. 1, FIG. 3 is a sectional view taken along B-B in FIG. 1, and FIG. 4 is an explanatory view illustrating an example of a thermocouple guide 32 in a tubular shaft 40.

The ceramic heater 10 is used to heat a wafer W on which processing, such as etching or CVD, is to be performed, and is installed within a vacuum chamber (not illustrated). The ceramic heater 10 includes a disk-shaped ceramic plate 20 having a wafer placement surface 20*a*, and a tubular shaft 40 that is bonded to a surface (rear surface) 20*b* of the ceramic plate 20 opposite to the wafer placement surface 20*a*.

The ceramic plate 20 is a disk-shaped plate made of a ceramic material represented by aluminum nitride or alumina. The diameter of the ceramic plate 20 is not limited to a particular value and may be about 300 mm, for example. The ceramic plate 20 is divided into an inner-peripheral-side zone Z1 of a small circular shape and an outer-peripheral-side zone Z2 of an annular shape by a virtual boundary 20*c* (see FIG. 3) concentric to the ceramic plate 20. An inner-peripheral-side resistance heating element 22 is embedded in the inner-peripheral-side zone Z1 of the ceramic plate 20, and an outer-peripheral-side resistance heating element 24 is embedded in the outer-peripheral-side zone Z2. The resistance heating elements 22 and 24 are each constituted by a coil containing, as a main component, molybdenum, tungsten, or tungsten carbide, for example. As illustrated in FIG. 2, the ceramic plate 20 is fabricated by surface-bonding an upper plate P1 and a lower plate P2 thinner than the upper plate P1.

The tubular shaft 40 is made of a ceramic material, such as aluminum nitride or alumina, like the ceramic plate 20. An upper end of the tubular shaft 40 is bonded to the ceramic plate 20 by diffusion bonding.

As illustrated in FIG. 3, the inner-peripheral-side resistance heating element 22 is formed such that it starts from one of a pair of terminals 22*a* and 22*b* and reaches the other of the pair of terminals 22*a* and 22*b* after being wired in a one-stroke pattern over substantially the entirety of the inner-peripheral-side zone Z1 while being folded at a plurality of turn-around points. The pair of terminals 22*a* and 22*b* are disposed in a region (within-shaft region) 20*d* of the rear surface 20*b* of the ceramic plate 20, the region locating within the tubular shaft 40. Power feeder rods 42*a* and 42*b* each made of a metal (for example, Ni) are bonded respectively to the pair of terminals 22*a* and 22*b*. The power feeder rods 42*a* and 42*b* are each inserted through an insulating tube (not illustrated).

As illustrated in FIG. 3, the outer-peripheral-side resistance heating element 24 is formed such that it starts from one of a pair of terminals 24*a* and 24*b* and reaches the other of the pair of terminals 24*a* and 24*b* after being wired in a one-stroke pattern over substantially the entirety of the outer-peripheral-side zone Z2 while being folded at a plurality of turn-around points. The pair of terminals 24*a* and 24*b* are disposed in the within-shaft region 20*d* of the rear surface 20*b* of the ceramic plate 20. Power feeder rods 44*a* and 44*b* each made of a metal (for example, Ni) are bonded respectively to the pair of terminals 24*a* and 24*b*. The power feeder rods 44*a* and 44*b* are each inserted through an insulating tube (not illustrated).

Inside the ceramic plate 20, as illustrated in FIG. 2, an elongate hole 26 into which an outer-peripheral-side thermocouple 50 is to be inserted is formed parallel to the wafer placement surface 20*a*. As illustrated in FIG. 3, the elongate hole 26 extends from a start point S in the within-shaft region 20*d* of the rear surface 20*b* of the ceramic plate 20 to a terminal end position E in an outer peripheral portion of the ceramic plate 20. The elongate hole 26 extends linearly from the start point S to the terminal end position E.

As illustrated in FIG. 4, the thermocouple guide 32 is a tubular member made of a metal (for example, stainless) and having a guide hole 32*a*. The thermocouple guide 32 includes a tip end portion 32*b* positioned at an upper end of the tubular shaft 40, a base end portion 32*c* positioned at a lower end of the tubular shaft 40, and a guide portion 32*d* disposed in a shape extending along an inner wall of the tubular shaft 40 over a region from the lower end of the tubular shaft 40 to the start point S. A curved portion 32*e* given as part of the guide portion 32*d*, the part extending up to a location just before the start point S, is curved to extend over about a ¼ circle in a circumferential direction (namely, to define part of a spiral) along the inner wall of the tubular shaft 40.

The outer-peripheral-side thermocouple 50 is inserted through the guide hole 32*a*. As illustrated in FIG. 3, the tip end portion 32*b* is arranged at the start point S of the elongate hole 26. The base end portion 32*c* is positioned below the lower end of the tubular shaft 40. The guide portion 32*d* guides the outer-peripheral-side thermocouple 50, having been inserted into the guide hole 32*a*, to be smoothly moved from the base end portion 32*c* to the tip end portion 32*b* of the thermocouple 50. The curved portion 32*e* is formed such that the tip end portion 32*b* gradually changes its direction to finally orient in a lengthwise direction of the elongate hole 26 while approaching the elongate hole 26. The thermocouple guide 32 may be formed of an electrically insulating material such as ceramic.

Inside the tubular shaft 40, as illustrated in FIG. 2, there are arranged the power feeder rods 42*a* and 42*b* connected respectively to the pair of terminals 22*a* and 22*b* of the inner-peripheral-side resistance heating element 22, and the power feeder rods 44*a* and 44*b* connected respectively to the pair of terminals 24*a* and 24*b* of the outer-peripheral-side resistance heating element 24. In addition, an inner-peripheral-side thermocouple 48 for measuring a temperature near the center of the ceramic plate 20 and the outer-peripheral-side thermocouple 50 for measuring a temperature near the outer periphery of the ceramic plate 20 are also arranged inside the tubular shaft 40. The inner-peripheral-side thermocouple 48 is inserted into a recess 49 formed in the rear surface 20*b* of the ceramic plate 20, and a temperature measurement portion 48*a* at a tip end of the inner-peripheral-side thermocouple 48 is held in contact with the ceramic plate 20. The recess 49 is formed at a position not interfering with the terminals 22*a*, 22*b*, 24*a* and 24*b*. The outer-peripheral-side thermocouple 50 is a sheathed thermocouple and is arranged to pass through the guide hole 32*a* of the thermocouple guide 32 and the elongate hole 26, and a temperature measurement portion 50*a* at a tip end of the thermocouple 50 reaches the terminal end position E of the elongate hole 26.

An example of manufacturing of the ceramic heater 10 will be described below. The power feeder rods 42*a*, 42*b*, 44*a* and 44*b* are bonded respectively to the terminals 22*a*, 22*b*, 24*a* and 24*b* that are exposed at the rear surface 20*b* of the ceramic plate 20, and the ceramic plate 20 and the tubular shaft 40 are bonded to each other. Then, the thermocouple guide 32 is inserted into the tubular shaft 40, and the tip end portion 32*b* is fixed to the start point S of the elongate hole 26. At that time, since the thermocouple guide 32 has the shape following the inner wall of the tubular shaft 40, the thermocouple guide 32 can be set inside the tubular shaft 40 without interfering with the power feeder rods 42*a*, 42*b*, 44*a* and 44*b* and the inner-peripheral-side thermocouple 48. Thereafter, the outer-peripheral-side thermocouple 50 is inserted through the guide hole 32*a* of the thermocouple guide 32 such that the temperature measurement portion 50*a* reaches the terminal end position E of the elongate hole 26.

An example of use of the ceramic heater 10 will be described below. First, the ceramic heater 10 is installed within a vacuum chamber (not illustrated), and the wafer W is placed on the wafer placement surface 20*a* of the ceramic heater 10. Then, electric power supplied to the inner-peripheral-side resistance heating element 22 is adjusted such that the temperature detected by the inner-peripheral-side thermocouple 48 is kept at a predetermined inner-peripheral-side target temperature. Furthermore, electric power supplied to the outer-peripheral-side resistance heating element 24 is adjusted such that the temperature detected by the outer-peripheral-side thermocouple 50 is kept at a predetermined outer-peripheral-side target temperature. Thus the temperature of the wafer W is controlled to be kept at a desired temperature. Thereafter, the interior of the vacuum chamber is evacuated to create a vacuum atmosphere or a pressure reduced atmosphere, plasma is generated inside the vacuum chamber, and CVD film formation or etching is performed on the wafer W by utilizing the generated plasma.

In the above-described ceramic heater 10 according to this embodiment, the part of the thermocouple guide 32 from the lower end of the tubular shaft 40 to the start point S of the elongate hole 26 is formed in the shape following the inner wall of the tubular shaft 40. Thus, with the thermocouple guide 32 and the outer-peripheral-side thermocouple 50 disposed along the inner wall of the tubular shaft 40, even when the terminals 22*a*, 22*b*, 24*a* and 24*b* (associated parts) are disposed near the center of the within-shaft region 20*d* and the power feeder rods 42*a*, 42*b*, 44*a* and 44*b* connected respectively to the terminals 22*a*, 22*b*, 24*a* and 24*b* are arranged in an inner space of the tubular shaft 40, those components are less likely to interfere with the thermocouple guide 32 and the outer-peripheral-side thermocouple 50. Accordingly, a degree of freedom in arrangement of the associated parts can be increased in the ceramic heater 10 that is a multi-zone heater.

Furthermore, with the ceramic heater 10 according to this embodiment, the curved portion 32*e* is curved toward the start point S of the elongate hole 26 in the shape defining part of a spiral along the inner wall of the tubular shaft 40, it is easier to dispose the thermocouple guide 32 and the outer-peripheral-side thermocouple 50 so as to follow the inner wall of the tubular shaft 40.

In addition, since the guide portion 32*d* of the thermocouple guide 32 is curved to gradually change its direction to finally orient in the lengthwise direction of the elongate hole 26 of the ceramic plate 20 while approaching the elongate hole 26, the outer-peripheral-side thermocouple 50 can easily be inserted into the elongate hole 26.

Note that it is apparent that the present invention is in no way limited to the embodiments described above, and the present invention can be carried out in a variety of ways within the technical scope of the present invention.

Figure 5:
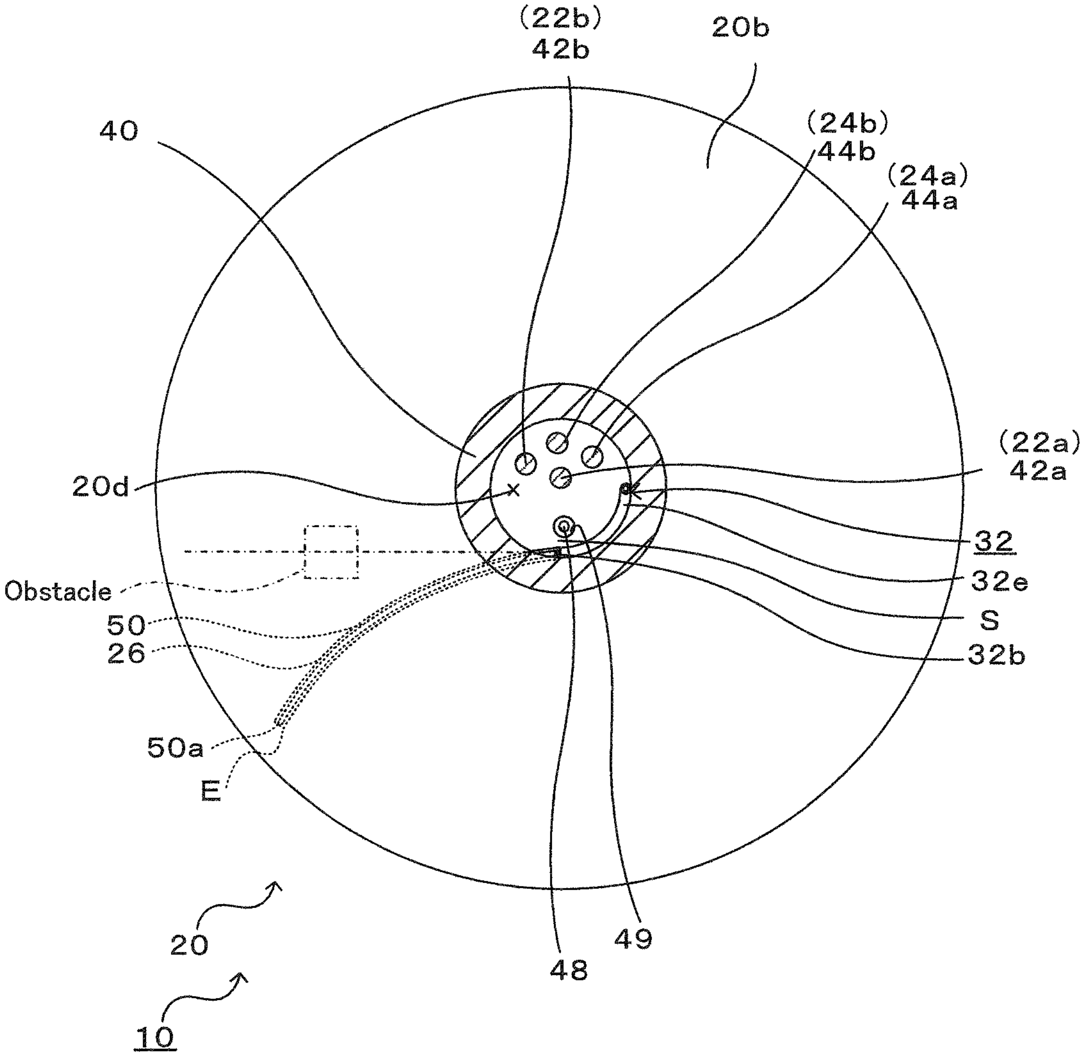
FIG. 5 is an explanatory view illustrating another example of the ceramic heater 10.
Figure 6:
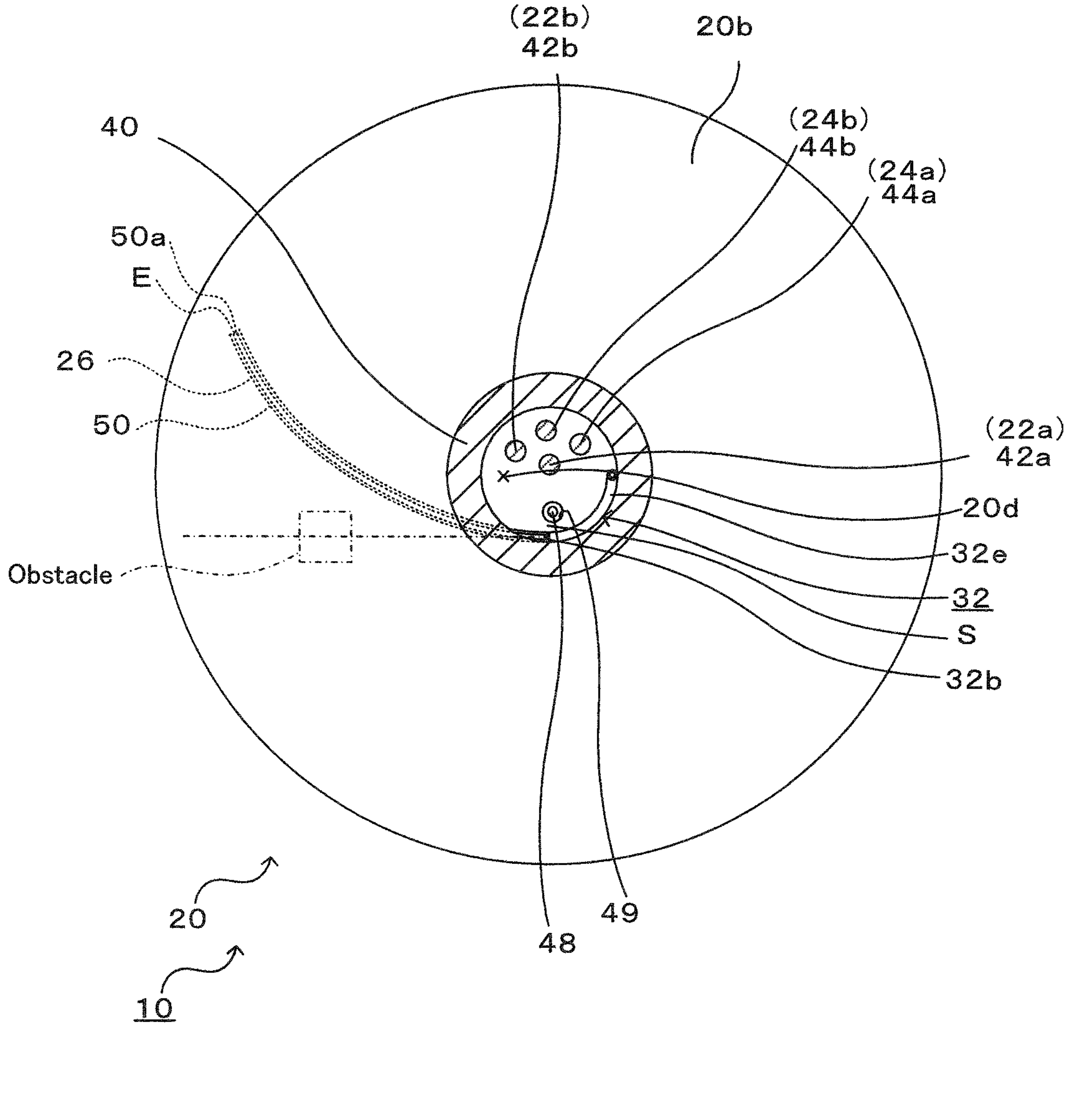
FIG. 6 is an explanatory view illustrating another example of the ceramic heater 10.

While, in the above-described embodiment, the elongate hole 26 extends linearly from the start point S to the terminal end position E, the present invention is not limited to such a case. For example, as illustrated in FIG. 5, the elongate hole 26 may be formed in a curved shape from the start point S to the terminal end position E. With this modification, when an obstacle, such as a through-hole, is present in the ceramic plate 20, the outer-peripheral-side thermocouple 50 can be arranged while avoiding the obstacle. Furthermore, as illustrated in FIG. 6, a direction in which the elongate hole 26 is curved when viewing the ceramic heater 10 from a lower end side of the tubular shaft 40 may match with a direction in which the curved portion 32*e* is curved. In FIG. 6, when viewing the ceramic heater 10 from the lower end side of the tubular shaft 40, the curved portion 32*e* is curved to the right (clockwise) toward the start point S, and the elongate hole 26 is also curved to the right (clockwise) from the start point S toward the terminal end position E. If the curved portion 32*e* is curved to the left (counterclockwise) toward the start point S when viewing the ceramic heater 10 from the lower end side of the tubular shaft 40, the elongate hole 26 is also curved to the left (counterclockwise) from the start point S toward the terminal end position E. In this case, it is possible not only to, when an obstacle, such as a through-hole, is present in the ceramic plate 20, arrange the outer-peripheral-side thermocouple 50 while avoiding the obstacle, but also to smoothly insert the outer-peripheral-side thermocouple 50. Signs in FIGS. 5 and 6 are the same as those used in the above-described embodiment.

While, in the above-described embodiment, the curved portion 32*e* is formed to extend over about a ¼ circle in the circumferential direction along the inner wall of the tubular shaft 40, the present invention is not limited to such a case. For example, the curved portion 32*e* may be formed to extend over a ½ circle or one circle or more in the circumferential direction along the inner wall of the tubular shaft 40.

While, in the above-described embodiment, the resistance heating elements 22 and 24 are each in the form of a coil, the shape of the resistance heating element is not always limited to the coil. In another example, the resistance heating element may be a print pattern or may have a ribbon-like or mesh-like shape.

Figure 7:
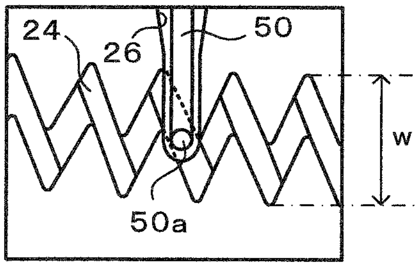
FIG. 7 is an explanatory view illustrating an example of a position of a temperature measurement portion 50*a* of an outer-peripheral-side thermocouple 50.
Figure 8:
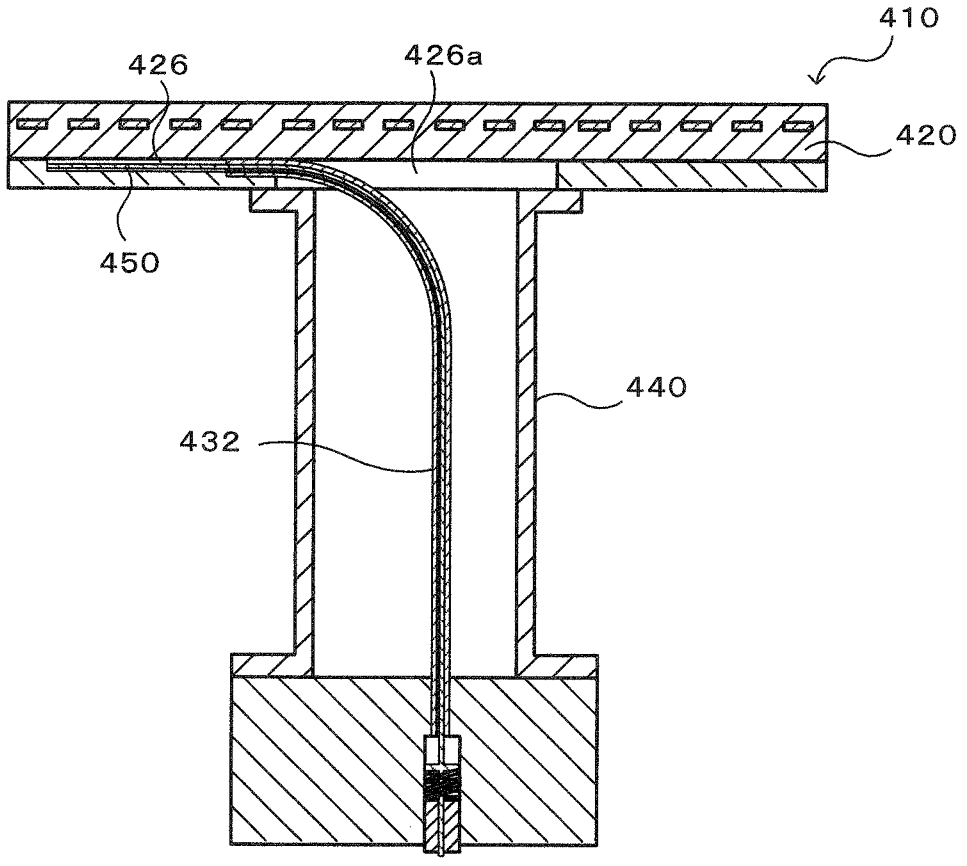
Fig. 8 Related Art
FIG. 8 is an explanatory view of a related-art ceramic heater.

In the above-described embodiment, the temperature measurement portion 50*a* of the outer-peripheral-side thermocouple 50 in the elongate hole 26 may be arranged, as illustrated in FIG. 7, to position within a width of the outer-peripheral-side resistance heating element 24 (namely, a width w of the coil) when viewed from the rear surface 20*b*. When the outer-peripheral-side resistance heating element 24 has the ribbon-like shape (shape of an elongate flat plate) instead of the coil-like shape, the temperature measurement portion 50*a* may be arranged to position within a width of the ribbon. With such an arrangement, a temperature change of the outer-peripheral-side resistance heating element 24 can be detected by the temperature measurement portion 50*a* of the outer-peripheral-side thermocouple 50 with a good response.

In the above-described embodiment, the ceramic plate 20 may incorporate an electrostatic electrode and/or an RF electrode in addition to the resistance heating elements 22 and 24.

In the above-described embodiment, one or more annular regions may be formed between the inner-peripheral-side resistance heating element 22 and the outer-peripheral-side resistance heating element 24, and an additional resistance heating element may be arranged in each annular region.

While, in the above-described embodiment, the length of the thermocouple guide 32 in a vertical direction is almost equal to the height of the tubular shaft 40, it may be set shorter or longer than the height of the tubular shaft 40.

In the above-described embodiment, the inner-peripheral-side zone Z1 may be divided into a plurality of inner-peripheral-side small zones, and the resistance heating element may be wired in a one-stroke pattern for each of the inner-peripheral-side small zones. Furthermore, the outer-peripheral-side zone Z2 may be divided into a plurality of outer-peripheral-side small zones, and the resistance heating element may be wired in a one-stroke pattern for each of the outer-peripheral-side small zones. Although the number of terminals increases depending on the number of small zones, the terminals do not interfere with the thermocouple guide 32. Accordingly, despite an increase in the number of terminals, the terminals can be relatively easily arranged near the center of the within-shaft region 20*d*.

The above embodiment has been described, by way of example, in connection with the assembly procedure of bonding the power feeder rods 42*a*, 42*b*, 44*a* and 44*b* to the terminals 22*a*, 22*b*, 24*a* and 24*b* of the ceramic plate 20, respectively, bonding the tubular shaft 40 to the rear surface 20*b* of the ceramic plate 20, and then attaching the thermocouple guide 32. However, the assembly procedure is not limited to such a case. For example, the power feeder rods 42*a*, 42*b*, 44*a* and 44*b* may be bonded to the terminals 22*a*, 22*b*, 24*a* and 24*b* of the ceramic plate 20, respectively, after bonding the tubular shaft 40 to the rear surface 20*b* of the ceramic plate 20 and attaching the thermocouple guide 32. Alternatively, the thermocouple guide 32 may be fixed to the start point S of the elongate hole 26 in advance, and the tubular shaft 40 may be bonded to the rear surface 20*b* of the ceramic plate 20 after bonding the power feeder rods 42*a*, 42*b*, 44*a* and 44*b* to the terminals 22*a*, 22*b*, 24*a* and 24*b* of the ceramic plate 20, respectively.

In the above-described embodiment, the thermocouple guide 32 remains placed inside the tubular shaft 40 even after the outer-peripheral-side thermocouple 50 has been inserted through the guide hole 32*a* of the thermocouple guide 32 and the temperature measurement portion 50*a* has reached the terminal end position E of the elongate hole 26. However, the present invention is not limited to such a case. For example, the thermocouple guide 32 may be removed after inserting the outer-peripheral-side thermocouple 50 through the guide hole 32*a* of the thermocouple guide 32.

The application claims priority to Japanese Patent Application No. 2020-016113 filed in the Japan Patent Office on Feb. 3, 2020, the entire contents of which are incorporated herein by reference.

What is claimed is:

1. A ceramic heater comprising:

a ceramic plate having a disk shape and having a wafer placement surface;

a tubular shaft having one end that is bonded to a rear surface of the ceramic plate on an opposite side to the wafer placement surface;

an inner-peripheral-side resistance heating element that is embedded in an inner peripheral portion of the ceramic plate;

an outer-peripheral-side resistance heating element that is embedded in an outer peripheral portion of the ceramic plate;

a within-shaft region of the rear surface of the ceramic plate, the within-shaft region locating within the tubular shaft;

an elongate hole that extends from a start point in an outer peripheral portion of the within-shaft region to a predetermined terminal end position in the outer peripheral portion of the ceramic plate;

associated parts that are disposed in the within-shaft region and that include a pair of terminals of the inner-peripheral-side resistance heating element and a pair of terminals of the outer-peripheral-side resistance heating element; and a thermocouple guide that guides a tip end of a thermocouple to come into the start point of the elongate hole, wherein a portion of the thermocouple guide, the portion extending from the other end of the tubular shaft to the start point of the elongate hole, is formed in a shape following an inner wall of the tubular shaft; and wherein the thermocouple guide is curved toward the start point of the elongate hole in a shape defining part of a spiral along the inner wall of the tubular shaft just before the start point of the elongate hole; and wherein the part of the spiral is one quarter to one half circle in the circumferential direction.

2. The ceramic heater according to claim 1, wherein the thermocouple guide is curved to gradually change a direction to finally orient in a lengthwise direction of the elongate hole of the ceramic plate while approaching the elongate hole.

3. The ceramic heater according to claim 1, wherein the elongate hole is curved toward the terminal end position from the start point.

4. The ceramic heater according to claim 1, wherein the elongate hole is curved toward the terminal end position from the start point, and a direction in which the elongate hole is curved matches a direction in which the thermocouple guide is curved, when viewing the ceramic heater from the other end side of the tubular shaft.

5. The ceramic heater according to claim 1, wherein the thermocouple is arranged to extend from the other end of the tubular shaft, to pass through the elongate hole, and to reach the terminal end position while being guided by the thermocouple guide.

6. A ceramic heater comprising:

a ceramic plate having a disk shape and having a wafer placement surface;

a tubular shaft having one end that is bonded to a rear surface of the ceramic plate on an opposite side to the wafer placement surface;

an inner-peripheral-side resistance heating element that is embedded in an inner peripheral portion of the ceramic plate;

an outer-peripheral-side resistance heating element that is embedded in an outer peripheral portion of the ceramic plate;

a within-shaft region of the rear surface of the ceramic plate, the within-shaft region locating within the tubular shaft;

an elongate hole that extends from a start point in an outer peripheral portion of the within-shaft region to a predetermined terminal end position in the outer peripheral portion of the ceramic plate;

associated parts that are disposed in the within-shaft region and that include a pair of terminals of the inner-peripheral-side resistance heating element and a pair of terminals of the outer-peripheral-side resistance heating element; and a thermocouple that is arranged to extend from the other end of the tubular shaft, to pass through the elongate hole, and to reach the terminal end position, wherein a portion of the thermocouple, the portion extending from the other end of the tubular shaft to the start point of the elongate hole, is formed in a shape following an inner wall of the tubular shaft; and wherein the thermocouple is curved toward the start point of the elongate hole in a shape defining part of a spiral along the inner wall of the tubular shaft, just before the start point of the elongate hole; and wherein the part of the spiral is one quarter to one half circle in the circumferential direction.

7. The ceramic heater according to claim 6, wherein the thermocouple is curved to gradually change a direction to finally orient in a lengthwise direction of the elongate hole of the ceramic plate while approaching the elongate hole.

8. The ceramic heater according to claim 6, wherein the elongate hole is curved toward the terminal end position from the start point.

9. The ceramic heater according to claim 6, wherein the elongate hole is curved toward the terminal end position from the start point, and a direction in which the elongate hole is curved matches a direction in which the thermocouple is curved, when viewing the ceramic heater from the other end side of the tubular shaft.

10. A thermocouple guide comprising a tip end portion and a base end portion in which the tip end portion is curved to define part of a spiral; and wherein the part of the spiral is one quarter to one half circle in the circumferential direction as a curved portion.

* * * * *